United States Patent
Lee

(10) Patent No.: US 8,128,027 B2
(45) Date of Patent: Mar. 6, 2012

(54) PLUG-N-PLAY POWER SYSTEM FOR AN ACCESSORY IN AN AIRCRAFT

(75) Inventor: Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 1276 days.

(21) Appl. No.: 11/303,173

(22) Filed: Dec. 16, 2005

(65) Prior Publication Data

US 2007/0057576 A1     Mar. 15, 2007

(51) Int. Cl.
*B64D 11/00* (2006.01)
*B64D 13/00* (2006.01)

(52) U.S. Cl. ...................... 244/118.5; 439/94

(58) Field of Classification Search ........... 244/118.5, 244/129.1; 174/97, 48; 362/404; 439/94, 439/110, 121, 527
See application file for complete search history.

(56) References Cited

U.S. PATENT DOCUMENTS

| | | | |
|---|---|---|---|
| 3,391,377 A | 7/1968 | Corl et al. | |
| 3,647,165 A | 3/1972 | Whitla | |
| 4,647,980 A * | 3/1987 | Steventon et al. | 348/837 |
| 4,756,528 A | 7/1988 | Umashankar | |
| 4,763,360 A | 8/1988 | Daniels et al. | |
| 4,774,514 A | 9/1988 | Hildebrandt et al. | |
| 4,853,555 A | 8/1989 | Wheat | |
| 4,881,907 A | 11/1989 | Bergman et al. | |
| 5,007,420 A | 4/1991 | Bird | |
| 5,145,128 A | 9/1992 | Umeda | |
| 5,207,589 A | 5/1993 | Lettenmayer | |
| 5,651,733 A | 7/1997 | Schumacher | |
| 5,743,487 A | 4/1998 | Rice | |
| 5,835,127 A | 11/1998 | Booth et al. | |
| 5,931,874 A * | 8/1999 | Ebert et al. | 701/1 |
| 6,393,343 B1 | 5/2002 | Frey et al. | |
| 6,424,386 B1 | 7/2002 | Shimizu | |
| 6,453,264 B1 | 9/2002 | Rudzik et al. | |
| 6,453,267 B1 | 9/2002 | Rudzik | |
| 6,871,356 B2 | 3/2005 | Chang | |
| 6,929,218 B1 * | 8/2005 | Sanford et al. | 244/118.5 |
| 7,083,437 B2 | 8/2006 | Mackness | |
| 7,084,932 B1 * | 8/2006 | Mathias et al. | 348/837 |
| 7,114,171 B2 | 9/2006 | Brady et al. | |
| 7,188,805 B2 * | 3/2007 | Henley et al. | 244/118.5 |
| 7,280,166 B2 | 10/2007 | Nagata et al. | |
| 7,520,686 B2 | 4/2009 | Droege et al. | |
| 7,597,286 B2 | 10/2009 | Callahan et al. | |

(Continued)

OTHER PUBLICATIONS

Non-Final Office Action for U.S. Appl. No. 11/303,652, mailed Aug. 4, 2008, 19 pages.

(Continued)

*Primary Examiner* — Tien Dinh
*Assistant Examiner* — Philip J Bonzell
(74) *Attorney, Agent, or Firm* — Caven & Aghevli LLC

(57) ABSTRACT

A power system for an aircraft. The power system comprises a power module unit and at least one mounting rail detachably coupled to the power module unit. The mounting rail provides structural support and electrical power to the power module unit. A power system in one embodiment may use mounting rails that double as power rails supplying power to the power module unit. Control is accomplished over a wireless link. The power rail control may be accomplished remotely via a standard or solid state relay. Normal rail power for the rail mounted power module may come from the utility bus.

6 Claims, 10 Drawing Sheets

U.S. PATENT DOCUMENTS

| | | | |
|---|---|---|---|
| 2002/0149708 A1* | 10/2002 | Nagata et al. | 348/837 |
| 2003/0117494 A1 | 6/2003 | Poblete | |
| 2003/0160706 A1 | 8/2003 | Endress et al. | |
| 2003/0194967 A1 | 10/2003 | Sanford et al. | |
| 2004/0098745 A1 | 5/2004 | Marston et al. | |
| 2004/0195446 A1 | 10/2004 | Smallhorn | |
| 2004/0235469 A1 | 11/2004 | Krug | |
| 2004/0249521 A1 | 12/2004 | Petersen et al. | |
| 2006/0109388 A1 | 5/2006 | Sanders et al. | |

OTHER PUBLICATIONS

Non-Final Office Action for U.S. Appl. No. 11/303,498, mailed Dec. 5, 2008, 6 pages.

Non-Final Office Action for U.S. Appl. No. 11/303,652, mailed Feb. 12, 2008, 18 pages.

Final Office Action for U.S. Appl. No. 11/303,654, mailed Jun. 16, 2010, 32 pages.

Non-Final Office Action for U.S. Appl. No. 11/303,652, mailed Apr. 26, 2010, 12 pages.

Non-Final Office Action for U.S. Appl. No. 11/303,116, mailed May 25, 2010, 20 pages.

Final Office Action for U.S. Appl. No. 11/303,116, mailed Oct. 20, 2010, 12 pages.

Final Office Action for U.S. Appl. No. 11/303,652, mailed Oct. 6, 2010, 12 pages.

* cited by examiner

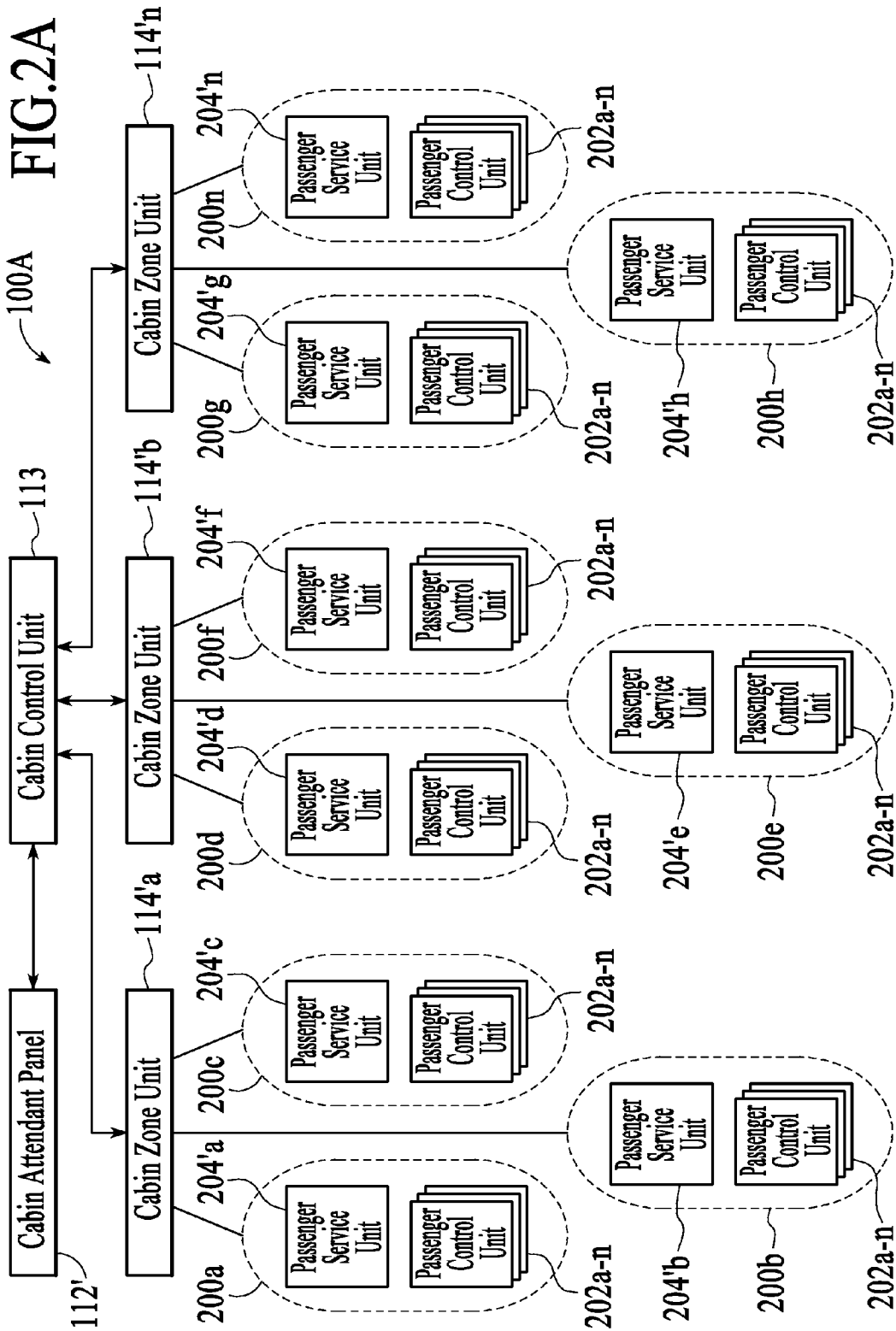

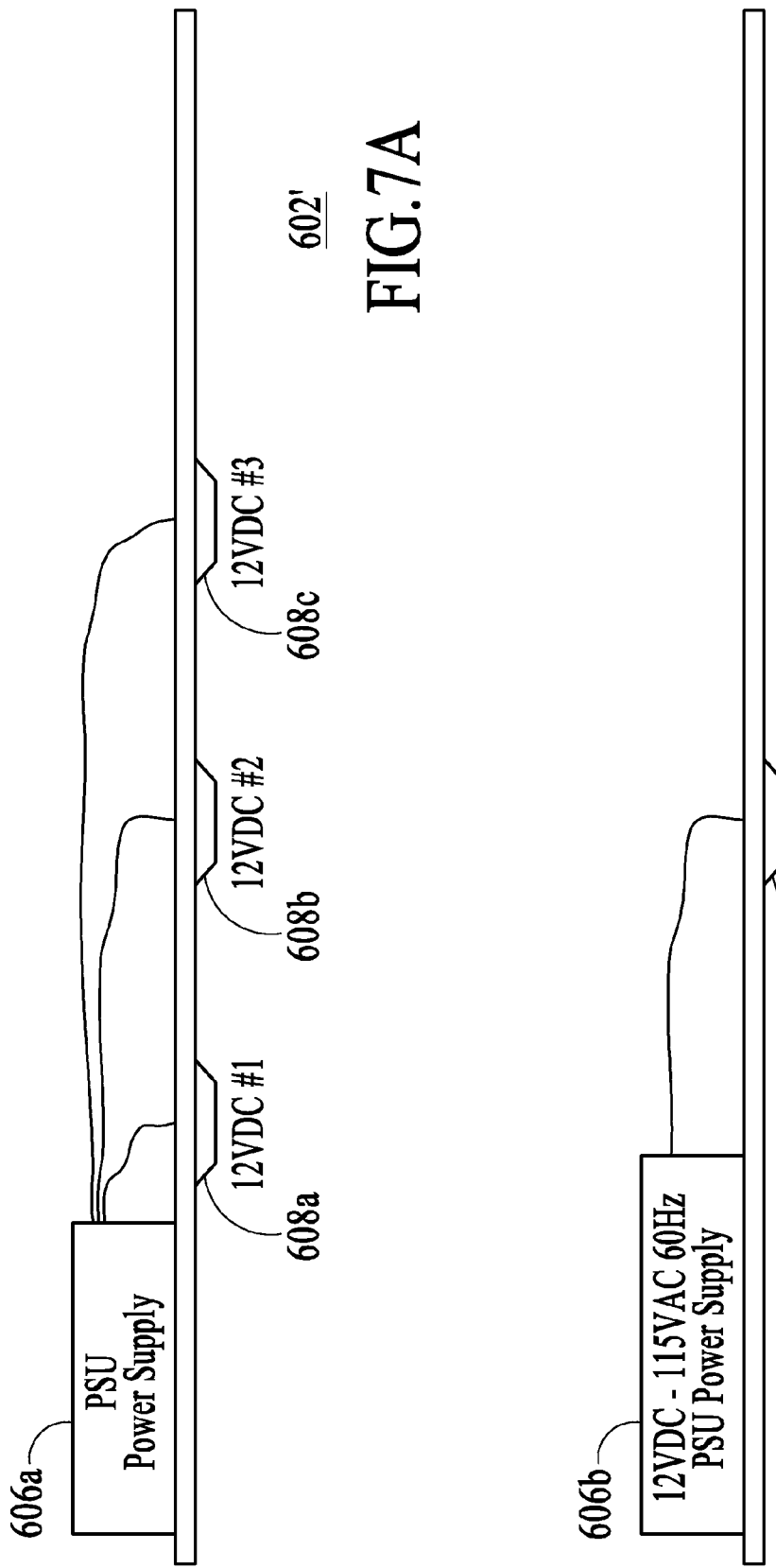

(12) United States Patent
US 8,128,027 B2

PLUG-N-PLAY POWER SYSTEM FOR AN ACCESSORY IN AN AIRCRAFT

FIELD OF THE INVENTION

The present invention relates generally to an aircraft and more specifically to a power system for accessories in the aircraft.

BACKGROUND OF THE INVENTION

In today's commercial airplanes, a power system for accessories such as laptop or notebook computer has complex power, delivery and discrete wiring, and is difficult to install. When a power system unit needs to be moved or replaced, it can take several minutes to accomplish the job based upon the complexity of the system. When this move or replace is associated with a seat repitch or retrofit within the aircraft, a great deal of time can be lost. Accordingly, it is desired to provide for the installation and removal of power system for accessories without the difficulties and time loss associated with the conventional overhead video passenger service.

Accordingly, what is needed is a system and method for providing a simple, lightweight and reliable power system unit in an aircraft. The present invention addresses such a need.

SUMMARY OF THE INVENTION

A power system for an aircraft is disclosed. The power system comprises a power module unit and at least one mounting rail detachably coupled to the power module unit. The mounting rail provides structural support and electrical power to the power module unit.

A power system in one embodiment may use mounting rails that double as power rails supplying power to the power module unit. Control is accomplished over a wireless link. The power rail control may be accomplished remotely via a standard or solid state relay. Normal rail power for the rail mounted power module unit may come from the utility bus.

BRIEF DESCRIPTION OF THE DRAWINGS

FIG. 2A illustrates a block diagram of a cabin services system in accordance with one of the embodiments.

FIG. 7A is a detailed view of the power module unit of FIG. 6B.

FIG. 7B is a detailed view of the power module of FIG. 6C.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with a number of embodiments streamlines the process for installation and removal of a one or more power units over conventional power module units. These embodiments may be utilized in conjunction with a rail system within an aircraft for providing power to the power module unit. In so doing, a system is provided that may allow for a power unit to be easily installed and removed. U.S. patent Ser. No. 11/303,498 entitled "Simplified Power System for a Cabin Services System for an Aircraft", filed on Dec. 16, 2005 and assigned to the assignee of the present application, described a power rail system in accordance with a number of embodiments and is incorporated by reference in its entirety herein. The embodiment of the power module unit is described in the context of a cabin services unit; however, one of ordinary skill in the art readily recognizes that a variety of cabin services units could be utilized within the spirit and scope of the present invention. Therefore, the following description is utilized to describe with particularity the features of the described embodiment, but in no way limited by the embodiments.

Figure 1:
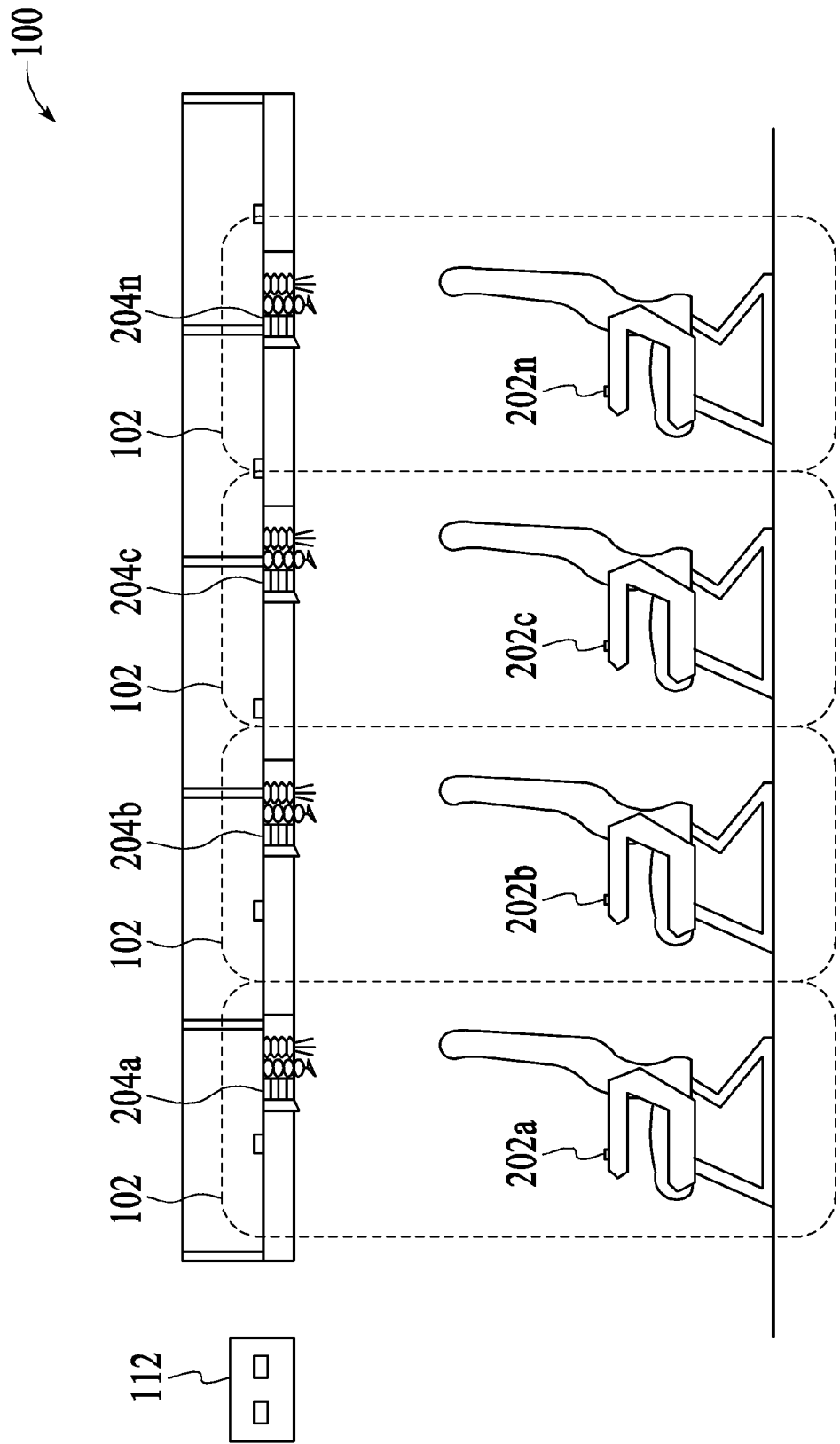
FIG. 1 illustrates a schematic diagram of a cabin services system in accordance with a number of embodiments.

A cabin services system 100 according to a number of embodiments is illustrated in FIG. 1. The cabin services system 100 may include a plurality of wireless networks 102. Each of the wireless networks 102 may transmit and receive passenger services commands. Each of the wireless networks 102 may be preferably associated with a seat group. The cabin services system 100 may further include wireless passenger control units 202a-202n, passenger service units 204a-204n, a plurality of cabin zone units 114, a cabin control unit (not shown) and a cabin attendant panel 112. Each passenger control unit 202a-202n may transmit cabin services system commands to a corresponding passenger service unit 204a-204n. Each passenger service unit 204a-204n may include a wireless receiver (not shown) and a controller (not shown) which are used to control passenger service unit functionality. The cabin services system 100 may further include a passenger service unit power rail (not shown) which is integrated with a passenger service unit mounting rail (not shown) to provide electrical power to each passenger service unit 204a-204n. Finally, individual personal air outlet fans may be installed in each passenger service unit 204a-204n to eliminate flex hose hookups that are typically required in conventional cabin services systems.

Additionally, systems may be greatly simplified, passenger controls may be more easily reached by passengers, and each passenger service unit 204a-204n may be quickly installed and maintained without any wiring or duct hookups.

Similarly, wireless interfaces may be used to provide data or control of other passenger service unit module functions. For example, video monitors mounted onto a passenger service unit may receive video data wirelessly via a cabin wireless network. Also, passenger signage can be controlled (turned on/off or fed content for display) via a wireless interface.

Taken together, these wireless interfaces allow for the elimination of wiring to passenger service unit modules. This leaves electrical power as the electrical interface to each passenger service unit module via the passenger service unit mounting rails themselves and also provides a means for powering non-essential or essential loads on these rails. In one implementation, the passenger service unit mounting rails are energized with electricity such that when a passenger service unit module is clipped to the mounting rail, electrical contact is also made between the passenger service unit module and the mounting rail to provide electrical energy to the passenger service unit module.

The powered passenger service unit rail system is comprised of the following components:

Airplane Wiring

Airplane wiring may consist of four wires:
Two non-essential power wires (typically 115 VAC and current return)
Two essential power wires (typically 28 VDC and current return)

Stow Bin Assembly

A typical commercial stow bin assembly consists of a housing assembly that supports a stow bin, passenger service unit mounting rails and other equipment.

Simplified Overhead Electronics Unit (SOEU)

The simplified overhead electronics unit (SOEU) for the embodiment performs three functions:
Convert power inputs into a "safe-to-touch" power output (such as 12V DC)
Switch the outputs from being powered by the non-essential power input to being powered by the essential power input whenever the essential bus becomes live
Reversing the polarity of the outputs when the essential bus becomes live Note that the simplified overhead electronics unit must perform its functions while maintaining circuit separation between the non-essential and the essential busses at all times.

To describe the features of the present embodiment in more detail refer now to the following description in conjunction with the accompanying figures.

Cabin Services System (CSS)

In one embodiment, a cabin services system 100' may include a cabin control unit 113 wired to a cabin attendant panel 112' as shown in FIG. 2A. The cabin control unit 113 may be wired to a plurality of cabin zone units 114. The cabin zone units 113 may in turn communicate wirelessly to a plurality of wireless seat group networks 115. Each wireless seat group network 200 may include a plurality of passenger control units 202a-202n that communicate wirelessly with one passenger service unit 204. In this method, data from the cabin attendant panel 112' may be relayed by wiring to the cabin zone unit 114' data and may be transmitted by the cabin zone unit 114' wirelessly to the passenger service unit 204. The wiring from the cabin attendant panel 112' to cabin zone unit 114' may exist for functions other than passenger service functions, (such as general cabin lighting control, cabin air temperature data, zonal attendant call light control and many other functions not related to the passenger service functions) thereby eliminating the need to add extra wire or wireless radio hardware for the cabin attendant panel 112' to passenger service unit 204' communication.

Figure 2B:
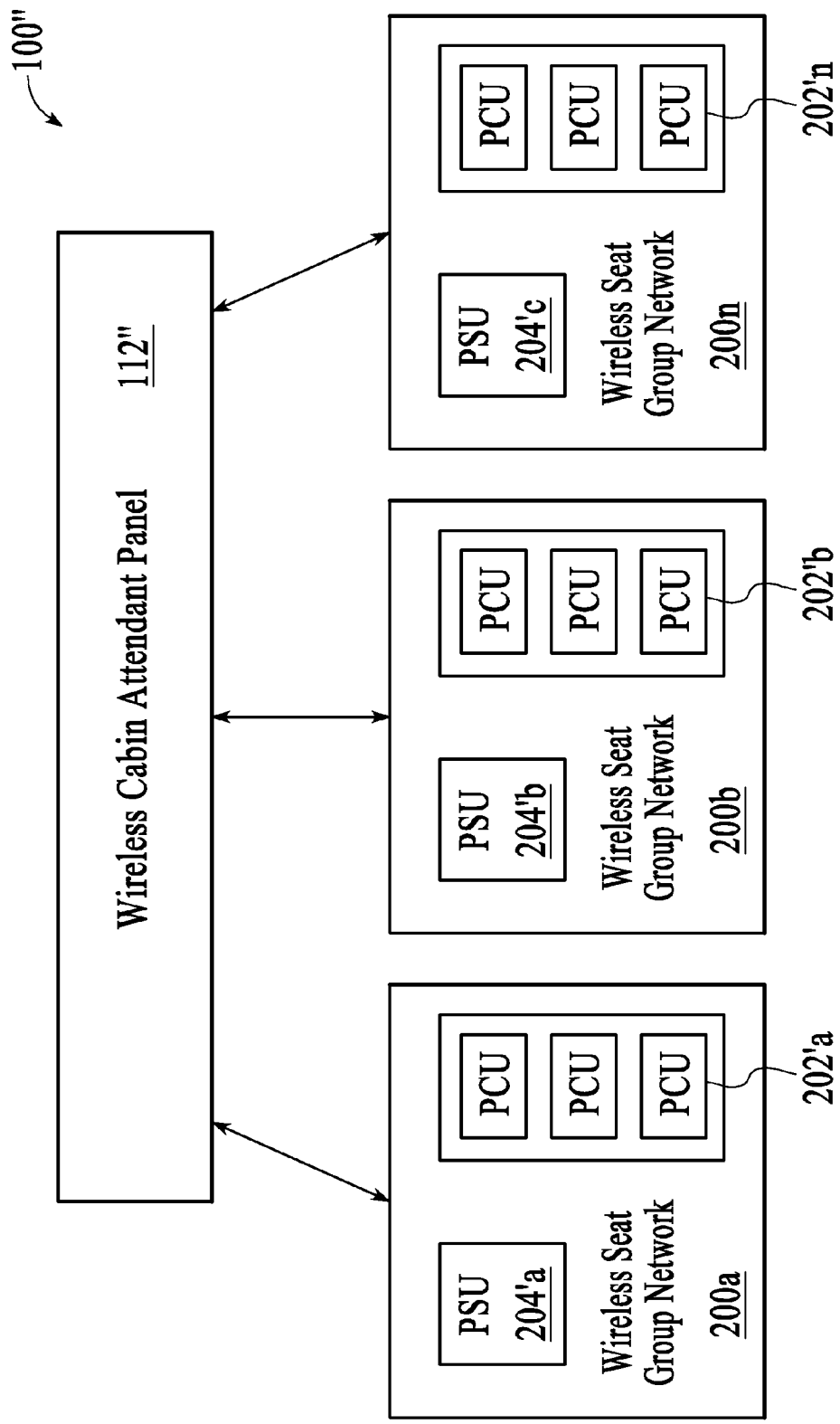
FIG. 2B illustrates a block diagram of an alternate embodiment of a cabin services system in accordance with one of the embodiments.

FIG. 2B illustrates a block diagram of an alternate embodiment of a cabin services system 100". The cabin services system 100" may include a wireless cabin attendant panel 112" that may communicate wirelessly with a plurality of wireless seat group networks. A wireless seat group network 200 may include a plurality of passenger control units 202'a-202'n that may communicate wirelessly with a passenger service unit 204'. This method may allow small commercial aircraft to perform cabin services functions normally found on large commercial aircraft. Further, the wireless cabin attendant panel 112" may wirelessly transmit commands to a plurality of other airplane components in order to control functions such as general cabin lighting, zonal attendant call light, and record cabin air temperature data. Each of the components listed above may be wirelessly enabled to afford this functionality.

Passenger Service Unit (PSU) 204

The passenger service unit 204 may comprise a wireless receiver 206, a controller 208, memory 210, reading lights 212a-212n, a flight attendant call light 214, a flight attendant call cancellation switch 216, personal air outlets 218a-218n, and a reed switch 220. The features of each of these components are described in more detail in conjunction with the accompanying figures hereunder.

The wireless passenger control unit transmitter 202 may allow for communication with the passenger service unit 204 without an in-flight entertainment system or any other wires. Thus, the cabin services system is not reliant on an in-flight entertainment system and an aircraft can be built without a conventional in-flight entertainment system. This allows airlines to choose not to install wired in-flight entertainment systems (which significantly reduces weight) or to use the latest portable in-flight entertainment systems, such as the digEplayer or eXpress, on widebody aircraft.

A passenger control unit including the wireless passenger control unit transmitter 202 may be installed anywhere in the passenger seat (seat arm, seat back, etc.) within easy reach of the passenger. Wireless passenger control unit transmitters 202 may be battery powered, or may use energy harvesting for power without batteries. An energy harvesting wireless passenger control unit transmitter may be constructed, for example, by integrating an EnOcean piezoelectric or electrodynamic wireless transmitter (www.enocean.com, part numbers PTM100 or PTM200) into a passenger control unit such that passenger actuation of the passenger control unit control buttons closes a specific control switch on the EnOcean transmitter and depresses the energy bar, thus resulting in wireless transmission of command telegrams from the passenger control unit to a receiver (for example, an EnOcean receiver—EnOcean P/N RCM 120) mounted in the passenger service unit. The command telegrams may include an identifier unique to the transmitter and indication of which control switch was closed at the time of pressing the energy bar.

Passenger Service Unit (PSU) Functionality

Passenger service unit modules may come in many forms. Any given passenger service unit module may include one or more of the following functionalities:
Flight attendant call light
Reading light
Personal air outlets
Emergency oxygen
In-flight entertainment system control such as video or audio channel selection
Cabin signage such as "fasten seat belt", "no smoking" or other passenger information It should be understood by one of ordinary skill in the art that a variety of other functions could be included and their use would be within the spirit and scope of the present embodiment.

In one embodiment, each passenger service unit may utilize the following features to allow it to easily snap onto a mounting rail in an aircraft without wire, duct or tube hookups: a 12V DC powered mounting rail, wireless technology, and fans mounted onto a passenger service unit.

Powered mounting rail: the passenger service unit mounting rail provides both a structural interface for installing a passenger service unit as well as an electrical power interface. Each passenger service unit may simply snap onto the mounting rail for both mechanical attachment and for electrical power.

Wireless technology: together, the wireless passenger control unit, wireless interface to the cabin attendant panel and the passenger service unit power rail (or power line) within the mounting rail may eliminate the need to hook up wires to a passenger service unit.

Fans mounted onto a passenger service unit: ducting for a personal air outlet and hookup to each passenger service unit may be replaced by individual personal air outlet fans built into each passenger service unit. This results in less noise (compared to high pressure ducting and nozzles of a conventional personal air outlet).

The reading light, flight attendant call, nozzles and fans of a personal air outlet and emergency oxygen may be assembled in an integrated passenger service unit module that snaps onto the mounting rail without any wire or duct hookups.

In one implementation, fans (mounted onto a passenger service unit) may draw "fresh" air into a passenger service unit plenum through an inlet grill located adjacent to the cabin air distribution nozzles. In such an implementation, ducts of a personal air outlet may be eliminated and cabin noise may be reduced.

In one implementation, oxygen masks may be deployed by turning off power to a utility bus on the passenger service unit mounting rail and momentarily turning on an essential power bus and reversing electrical polarity on a power rail within the passenger service unit mounting rail. Current will then flow through a diode in the oxygen circuit to activate the mask drop solenoid.

Cabin Attendant Panel (CAP)

Figure 2C:
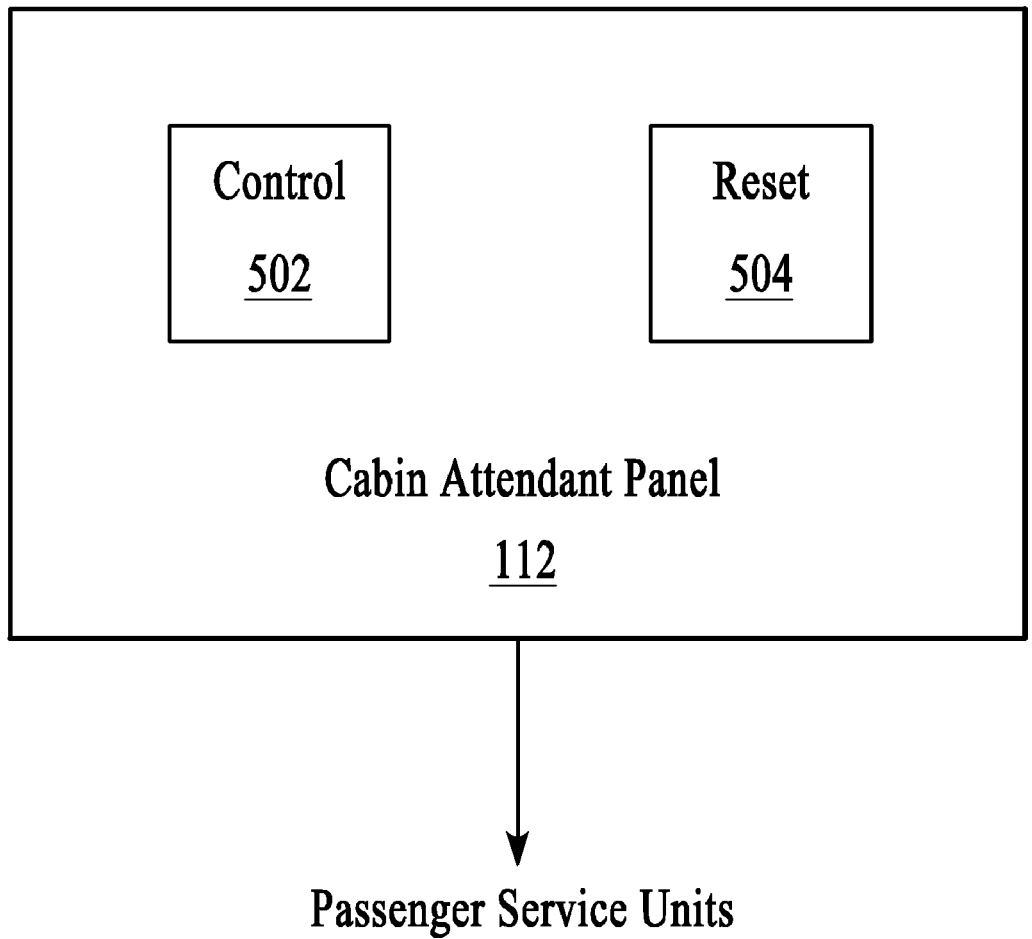
FIG. 2C illustrates one implementation of the cabin attendant panel.

FIG. 2C illustrates one implementation of the cabin attendant panel 112. The wireless cabin attendant panel 112 may be used to transmit wireless control signals via control button 402 directly to groups of passenger service units for functions such as turning on/off passenger signage (e.g., "No Smoking", "Fasten Seat Belt", etc.), and for resetting the passenger service units via reset button 404 during gate turnaround between flights (e.g., turning off all reading lights, personal air outlets, and flight attendant call lights; and turning on all "No Smoking" and "Fasten Seat Belt" signs). In this manner, the cabin control unit and cabin zone module may be bypassed, greatly simplifying the system architecture.

In a preferred implementation of the cabin attendant panel, the cabin attendant panel may make use of other aircraft wireless transmitters located in various positions in the airplane to relay its control signals to the seat group networks. These other wireless transmitters can include a wireless function added to the cabin zone modules (part of the cabin services system). In this case, the cabin attendant panel may be part of a wired or wireless network common to these zone control electronic boxes. It may also be part of other aircraft systems, such as a wireless cabin network. The cabin attendant panel can further include a display (not shown) for displaying data (e.g., prognostic data) to a mechanic or flight personnel, as described in greater detail below.

Passenger Service Unit (PSU) Mounting Rails

Figure 3:
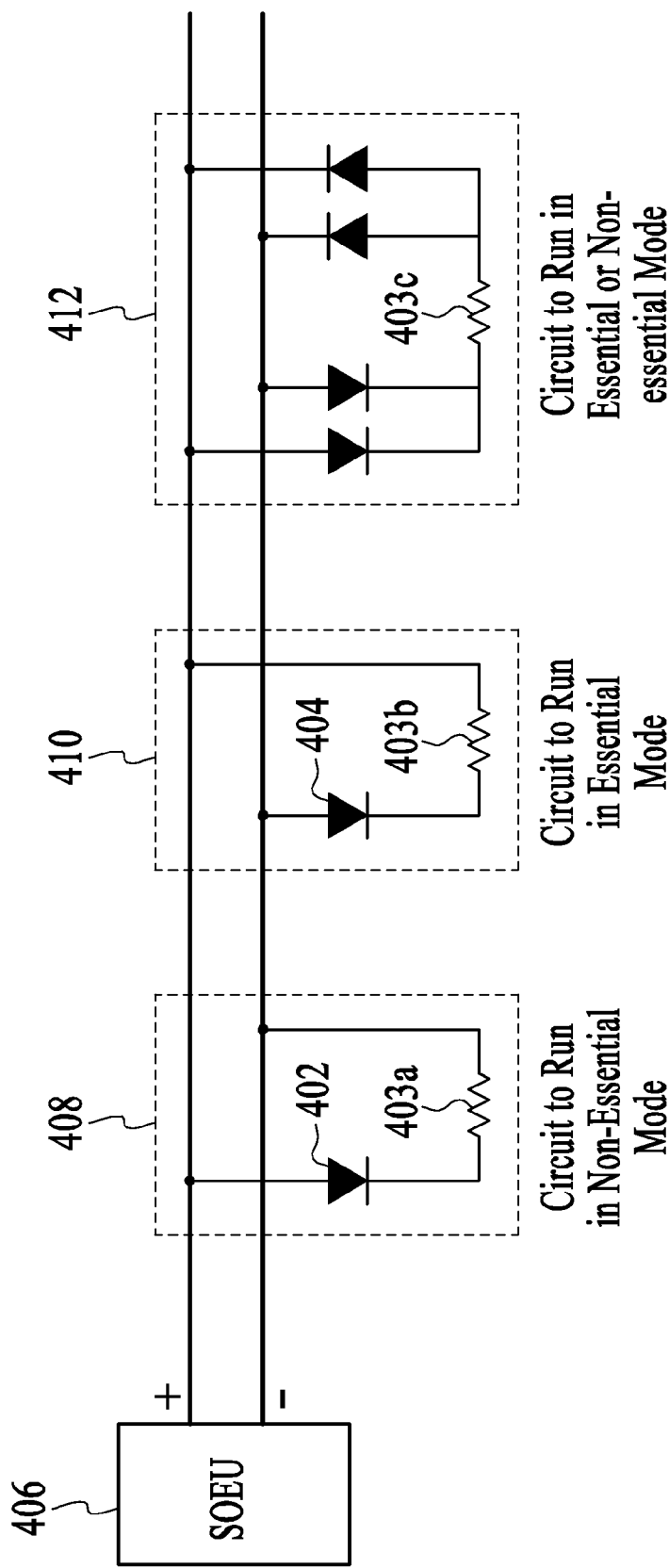
FIG. 3 is a diagram that illustrates the operation of passenger service unit mounting rails with circuits connected thereto.

FIG. 3 is a diagram that illustrates the operation of the passenger service unit mounting rails with passenger service unit circuits as indicated by loads 403a, 403b and 403c connected thereto. As is seen, under normal operating conditions, a diode 402 in series with each passenger service unit module circuit allows current to flow through non-essential circuits 408. Non-essential circuits are, for example, circuits for in-flight entertainment monitors, reading lights and flight attendant call lights. For essential circuits 410, such as one for oxygen deployment, a diode 404 in series prevents current from flowing into the circuit. Thus, under non-normal operating conditions, such as during emergency oxygen deployment, the output of the wireless overhead electronics unit 406 reverts from a non-essential power mode to an essential power mode and the output polarity is reversed. Thus, the diodes 402 on the non-essential circuits prevent current to flow through them while the diodes 404 on the essential circuits now allow current to flow through them. This can be used, for example, to momentarily power a solenoid that opens an oxygen mask door thus allowing oxygen masks to fall into the cabin, or, for example, to continuously power a wirelessly activated oxygen system.

Note that if a circuit 412 requires power during both normal and non-normal conditions, diodes may be used to provide power to the circuit 412 under either condition. Also note that if the circuit 412 could operate with either polarity, no diodes would be necessary and the circuit may be connected to each of the rails.

In one implementation, the 12V DC mounting rail contact and the current return contact may be widely spaced. In this implementation, such a design helps to prevent accidental shorting across the contacts with, e.g., a conductive tool that might otherwise startle a mechanic by discharging sparks. Additionally, all portions of the passenger service unit mounting rails that cannot be contacted by the electrical contact of the passenger service unit may be made from non-conductive materials or finished with non-conductive finishes as another preventive measure against accidental shorting.

The passenger service unit power rail may implement any low voltage power type, AC or DC. Many power rail designs other than that shown in FIG. 3 are feasible. For example, the male spring contact may be moved to the passenger service unit with the female contact inserted into a groove in the mounting rail arm. In this case, both the 12V DC mounting rail contact and current return contact may be located on the same side of the passenger service unit (instead of opposite sides) since both mounting rail contacts can be recessed protecting them from accidental shorting with, e.g., a conductive tool.

Figure 4:
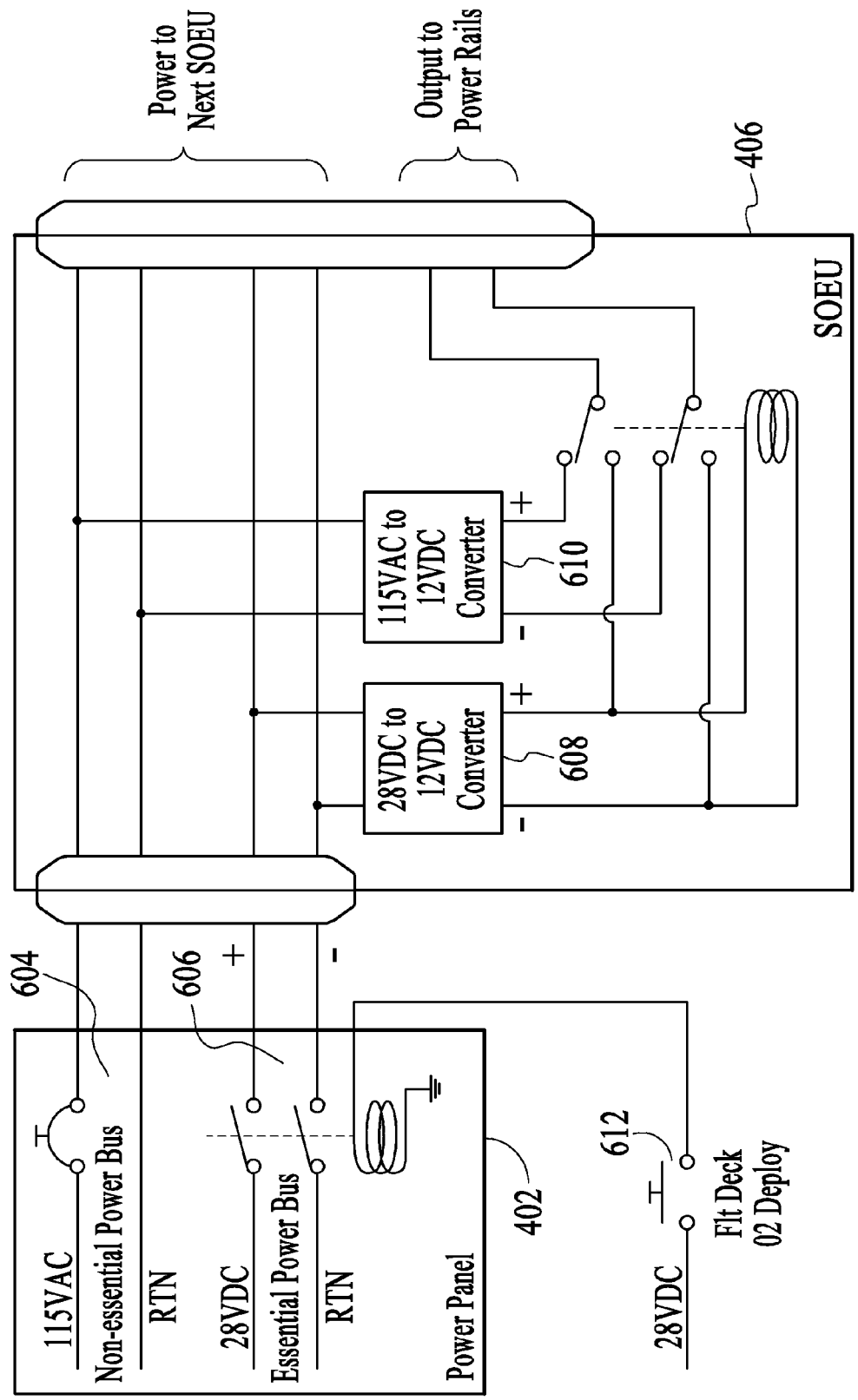
FIG. 4 is an example of a simplified wireless overhead electronics unit.

FIG. 4 is an embodiment of a simplified overhead electronics unit (SOEU) 400. As is seen, a power panel 402 provides power to the simplified overhead electronics unit 406 via a non-essential power bus 404 and/or an essential power bus 406. In this embodiment the non-essential power bus 404 may be 115 VAC and the essential power bus 406 may be 28 VDC. The simplified overhead electronics unit 400 may include a first converter 408 for converting the essential voltage from in this embodiment 28 VDC to 12 VDC and a second converter 410 for converting the essential voltage bus from 115 VAC to 12 VDC. The simplified overhead electronics unit 406 may be typically mounted on the stow bin assembly. In this example, only power from the non-essential power bus inputs are being used to create the 12 VDC output under normal operating conditions (when the essential bus 406 is not live). When the essential power bus 406 becomes live, a relay may be energized to switch the output from being driven by the non-essential power bus 404 to being driven by the essential power bus 406 input. Note that the output polarity will be reversed relative to the normal operating condition when this occurs.

In this example:

The non-essential power bus 404 may be 115 VAC and may be transformed to 12 VDC by an AC-to-DC converter 610 within the simplified overhead electronics unit 400.

The non-essential power bus 404 may also be turned off without turning on the essential power bus 406 by opening a circuit breaker or relay, typically located in a power panel.

The essential power bus 406 may be 28 VDC and may be converted to 12 VDC by a DC-to-DC converter 608 within the simplified overhead electronics unit 400.

The essential power bus 406 may typically be turned on via a relay typically located in a power panel. The relay may, for example, be activated by a switch 412 in the Flight Deck, such as for emergency oxygen deployment.

The power buses may be fed through the simplified overhead electronics unit 406 for installation convenience. This may allow several simplified overhead electronic units 400 to be daisy chained together down the airplane.

There are several ways to accomplish the simplified overhead electronics unit 400 functionality. The example circuit shown in FIG. 4 is just one way to implement this function.

Passenger Service Unit Mounting Rail

Figure 5:
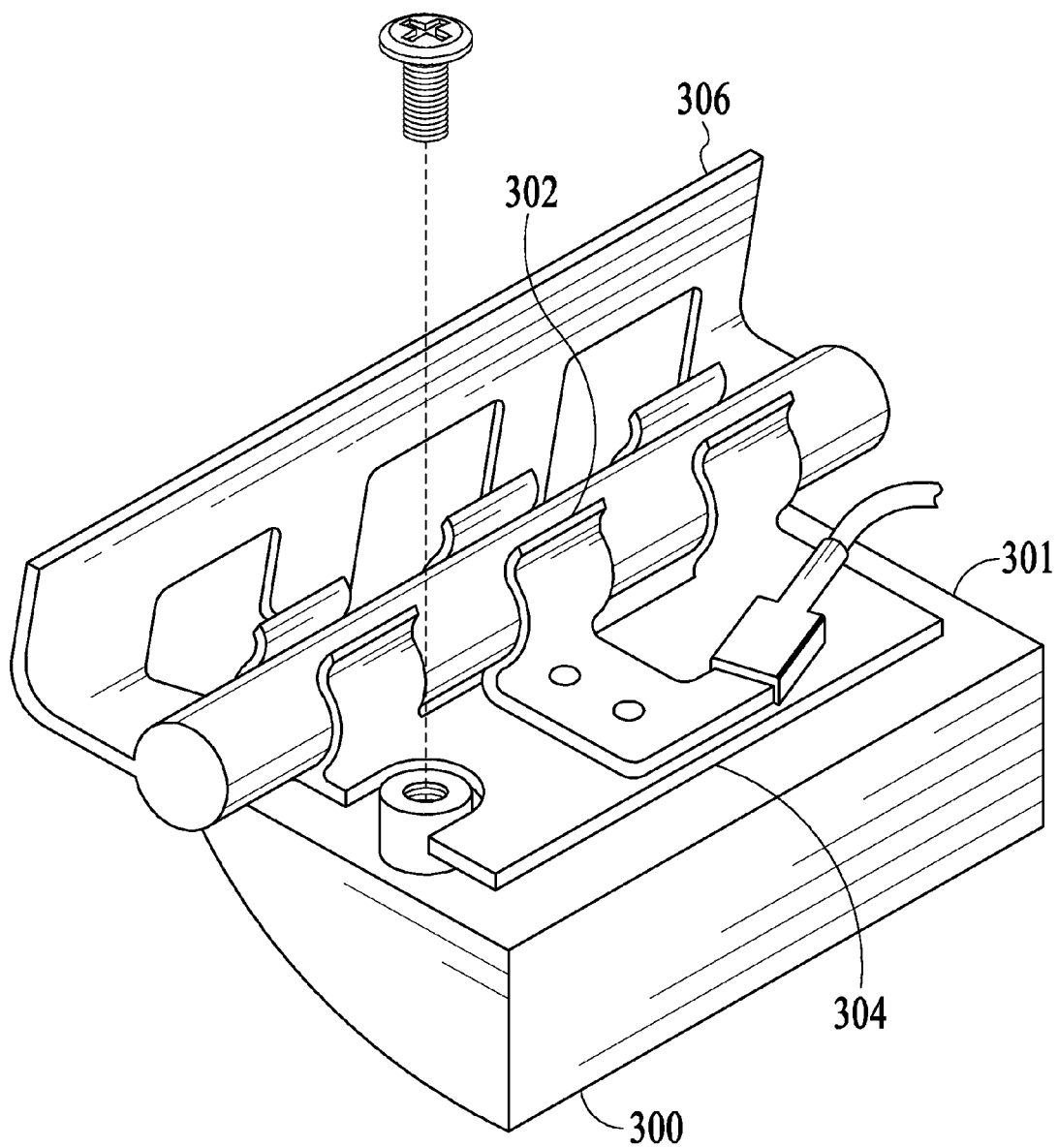
FIG. 5 is a perspective view of a portion of a passenger service unit module.

FIG. 5 is a perspective view of a portion of the passenger service unit module 300. The portion of the passenger service unit module 300 illustrated in FIG. 5 shows an electrical contact assembly 301. The assembly 301 may comprise an electrical spring contact 302 and a plastic, non-conductive, insulating support 304. The electrical spring contact 302 may be made of, for example, beryllium copper that is nickel and gold plated. The electrical spring contact 302 may be designed to clip onto the round portion of electrically conductive passenger service unit mounting rail 306. The plastic support 304 may be also designed to clip onto the passenger service unit mounting rail 306 and may be intended to support the electrical spring contact 302 and to prevent the electrical spring contact 302 from rocking back and forth on the passenger service unit mounting rail 306. The electrical contact assembly 301 may be loosely fastened to a passenger service unit module such that when a passenger service unit module vibrates under the passenger service unit mounting rail 306, the electrical spring contact 302 will float over the passenger service unit module and maintain its grip on the passenger service unit mounting rail 306. With these elements in place, the electrical spring contact 302 may mate with the electrically conductive portion of the passenger service unit mounting rail 306 when the passenger service unit is installed and held in place by the passenger service unit catches (not shown).

Accordingly, each passenger service unit module 300 may receive electrical power from the mounting rail 306 via its electrical spring contacts 302.

Passenger service unit mounting rails may be typically constructed from an aluminum extrusion that is approximately the same length as the stow bin assembly. In this embodiment the mounting rails may have the following features:

Each rail may be electrically connected to one of the outputs from the simplified overhead electronics unit 406 via a wire. Thus, one rail may be connected to the normally positive DC output and the other rail may be connected to the normally negative DC output.

The edge of the rail that passenger service unit module clips may attach to is kept electrically conductive. While most surfaces of the rail are typically primed and painted, the aluminum rail along this edge may be plated, for example, with nickel and gold to provide electrical conduction.

Note that the simplified overhead electronics unit above may energize these rails with 12 VDC voltage.

In a system and method in accordance with the present embodiment the passenger service unit mounting rails may perform two functions:

(1) Mechanical support of the passenger service unit modules; and (2) Electrical supply to the passenger service unit modules.

This may minimize the addition of new components or weight to the airplane. However, because of this dual functionality, electrical isolation may be required between the rail and any adjacent conductive airplane parts. Thus, plastic bushings may likely be used at the rail mounting points.

When combined with a wireless data infrastructure, the mounting rails may greatly simplifies the passenger service unit installation by providing electrical power to passenger service unit modules via the passenger service unit mounting rails instead of through electrical wiring. With no data or power wiring interfaces, passenger service unit modules may be able to be installed, removed or relocated much more rapidly.

Power Module Units

Figure 6A:
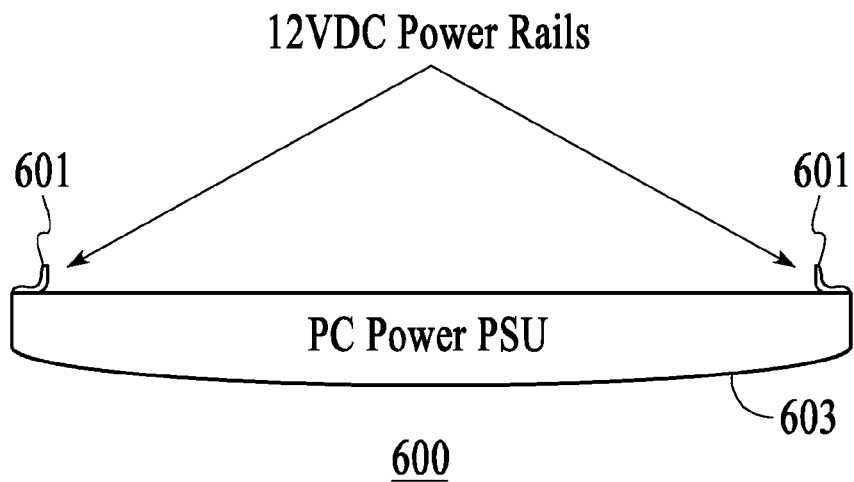
FIG. 6A is a view of an embodiment of a power system.

FIG. 6A is a view of one embodiment of a power system 600. In this system, a power panel may be mounted on structural bin rails that double as power rails 601. The rails 60 I provide power to the power module unit 604. Current limiting and short circuit protection may be provided by a power module unit power supply.

Figure 6B:
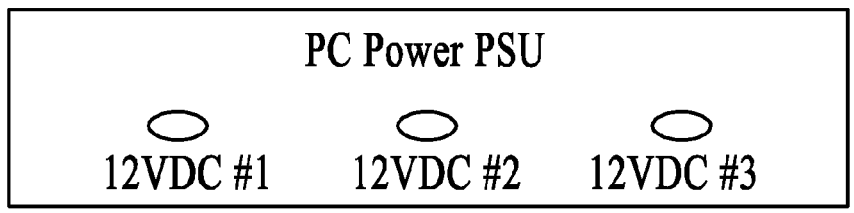
FIG. 6B is a block diagram of one embodiment of a power module unit.

FIG. 6B is a block diagram of one embodiment of a power module unit 602. FIG. 7A is a detailed view of the power module unit 602 shown in FIG. 6B.

Referring to FIG. 7A, power supply 606a may provide power conditioning to the three power outlets 608a-c limiting the current sourced to each outlet to a predetermined current such as 1.5 A. In this embodiment, the three power outlets may provide 12 VDC.

Figure 6C:
FIG. 6C is a block diagram of another embodiment of a power module unit.

FIG. 6C is a block diagram of another embodiment of a power module unit 604. FIG. 7B is a detailed view of the power module 604.

Referring to FIG. 7B, the power supply 606b may provide power to a power outlets 610 limiting the current source to a predetermined current such as 1.5 A. In this embodiment, the power supply may provide power conditioning and 60 HZ power inversion to provide a standard 115 VAC power outlet.

In both FIGS. 7A and 7B, the passenger service unit power supply may obtain their power from the powered rails. That power is then conditioned by the passenger service unit power supply 606a and 606b and distributed to the individual automotive or defined power connectors. Accordingly, the power supply may provide power to an accessory portable device on the aircraft such as a laptop computer, notebook computer, personal digital assistant, portable phone, MP3 player, IPOD or the like.

Figure 8:
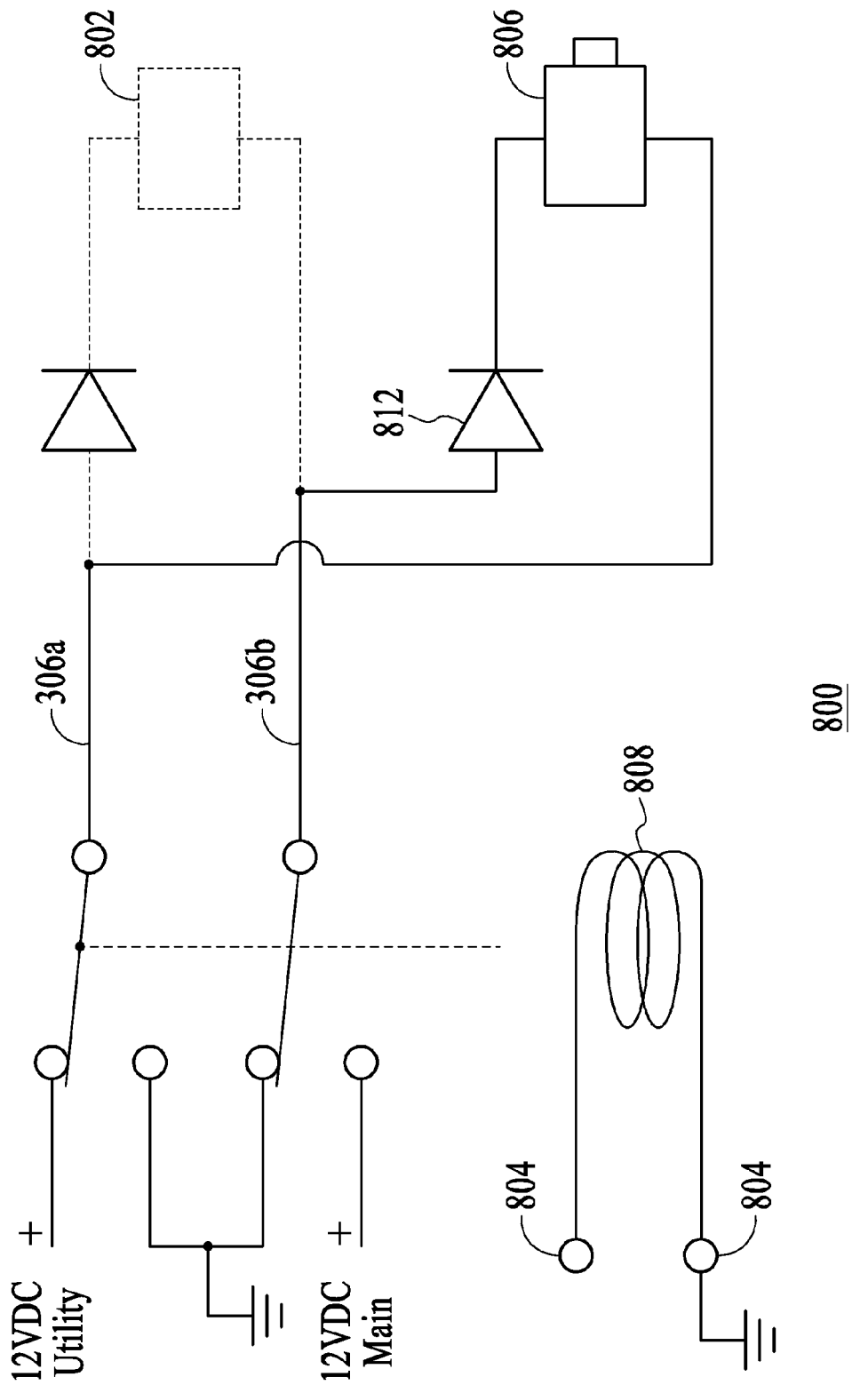
FIG. 8 is a block diagram of the embodiment of a power switching system for use with the power module unit.

FIG. 8 is a block diagram of the embodiment of a power switching system 800 for use with a power module unit 802 in accordance with a number of embodiments. The power switching system 800 may utilize a relay 808 (either a mechanical or a solid state). Since the power module unit 802 may share the power rails 306a-306b with the oxygen passenger service unit (not shown), each power module unit 802 may be protected by diode 812 to prevent power from being applied to the power system 802 while oxygen may be deployed.

In this system, the power rails 306a-306b may also double as the oxygen mask deploy wiring. The oxygen deploy discrete output 804 may be tied to the relay coil 808. When oxygen is commanded, the relay 808 may be energized and 12 VDC power from the primary bus may be routed to the power rails 306*a*-306*b* in reverse polarity causing the oxygen passenger service unit door solenoid 806 to be energized causing the oxygen masks (not shown) to deploy. The diode 812 in the power module unit 802 may keep the power system off until utility bus power is restored and the oxygen discrete is returned to its normal state. The details of one embodiment of an oxygen deployment system are described, for example, in U.S. patent Ser. No. 11/303,498 entitled "Simplified Power System for a Cabin Services System for an Aircraft", filed on Dec. 16, 2005, assigned to the assignee of the present embodiment, and incorporated by reference herein.

OTHER EMBODIMENTS

Many other embodiments of this system are possible:

In addition, separate power rails may be added to the stowage bin assembly, parallel to the passenger service unit mounting rails, in order to provide the electrical power function.

This system does not rely on wireless data communication to the passenger service unit modules. Other communication options may include traditional wires or communications over power line (COPL) technologies.

Circuits that need to operate when power is completely shut off from the rails may include a battery or capacitor that is charged via the rails during normal operation.

The power rail may use any of low voltage power type, AC or DC. Many power rail and electrical contact designs other than that shown in FIG. 5 are feasible.

Accordingly, a system and method in accordance with the embodiment provides an overhead video system that is integrated with a passenger service unit power rail to provide a modular system. As a result, the overhead system can be installed and replaced in an efficient fashion.

Although the present embodiment has been described in accordance with the embodiments shown, one of ordinary skill in the art will readily recognize that there could be variations to the embodiments and those variations would be within the spirit and scope of the present embodiment. For example, implementations of a cabin services system described above can be implemented in any type of commercial vehicles including, e.g., helicopters, passenger ships, automobiles, and so on. Accordingly, many modifications may be made by one of ordinary skill in the art without departing from the spirit and scope of the appended claims.

What is claimed is:

1. A passenger services system for a vehicle, comprising:
a passenger service unit to communicate wirelessly with a cabin attendant panel and provide a plurality of cabin services;
a passenger control unit to communicate wirelessly with the passenger service unit and each including a plurality of switches corresponding to the plurality of cabin services;
an electrical spring contact;
at least one power system to provide power to the passenger services system, the at least one power system comprising a power module unit; and
at least one mounting rail to provide both structural support and electrical power to the power module unit and to the passenger service unit,
wherein the passenger service unit is coupled to the electrical spring contact that detachably clips to the at least one mounting rail, the electrical spring contact providing both structural support to the passenger service unit and a spring coupling to the at least one mounting rail, wherein the electrical spring contact is coupled to the passenger service unit by a non-conductive insulating support that clips onto the mounting rail and provides electrical isolation from the passenger service unit.

2. The passenger services system of claim 1 wherein the at least one power system comprises:
a simplified overhead electronics unit (SOEU);
a first electrical circuit coupled to the mounting rail and the SOEU for allowing operation of essential functions while electrically connected to the mounting rail; and
a second electrical circuit coupled to the mounting rail and the SOEU for allowing operation of the at least one power system while electrically connected to the mounting rail, the at least one power system providing power for operation of non-essential functions.

3. The passenger services system of claim 2 wherein the first electrical circuit and the second electrical circuit operate alternately based upon a polarity of the power of the mounting rail.

4. The passenger services system of claim 3 wherein the first electrical circuit and the second electrical circuit operate concurrently.

5. The passenger services system of claim 3 wherein the SOEU utilizes a discrete signal to trigger a reversal of the polarity of the power of the mountina rail.

6. The passenger services system of claim 5 wherein the SOEU provides power to an oxygen passenger service unit module.

* * * * *